United States Patent
Shichiku et al.

(10) Patent No.: US 6,317,817 B1
(45) Date of Patent: Nov. 13, 2001

(54) IMAGE OPERATION PROCESSING APPARATUS STORING DISCRETE DATA EFFICIENTLY IN A MEMORY AND OPERATING METHOD THEREOF

(75) Inventors: Ricardo T. Shichiku, Kashihara; Tsuyoshi Muramatsu, Nara; Shinichi Yoshida, Kashihara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/078,491

(22) Filed: May 14, 1998

(30) Foreign Application Priority Data

May 16, 1997 (JP) .................................................... 9-126745

(51) Int. Cl.⁷ ...................................................... G06F 12/00
(52) U.S. Cl. .............................. 711/202; 711/169; 710/68
(58) Field of Search .................................... 711/202, 169, 711/205, 206, 207; 710/68; 712/201; 395/516; 370/420; 345/515–517

(56) References Cited

U.S. PATENT DOCUMENTS

| | | | |
|---|---|---|---|
| 5,241,626 | * 8/1993 | Taoda | 395/516 |
| 5,526,502 | * 6/1996 | Yoshida et al. | 711/202 |
| 5,748,933 | * 5/1998 | Amagai et al. | 712/201 |
| 5,761,737 | * 6/1998 | Kadosumi et al. | 711/169 |
| 5,860,130 | * 1/1999 | Yamanaka et al. | 711/169 |
| 5,917,819 | * 6/1999 | Yang et al. | 370/390 |

FOREIGN PATENT DOCUMENTS

A5-274213   10/1993   (JP) .

* cited by examiner

Primary Examiner—Do Hyun Yoo
Assistant Examiner—Nasser Moazzami

(57) ABSTRACT

An image operation processing apparatus is connected to a memory. The apparatus processes, by accessing the memory, a data packet including instruction information and an address of a prescribed address space. The apparatus realizes an address translation process for translating the address included in an incoming data packet to an address of a partial address space smaller than the prescribed address space. It further realizes a memory access process for accessing the memory in accordance with the address translated by the address translation process. Finally, it performs a process in accordance with the instruction information included in the data packet.

6 Claims, 7 Drawing Sheets

| ADDRESS | OPCODE | NODE | CONSTANT |
| --- | --- | --- | --- |
| 0000 | write | 1(0x01) | 0(0x0000) |
| 0001 | read_write_mod | 2(0x02) | 2(0x0002) |
| 0002 | OUT[71] | 3(0x01) | 1(0x0001) |

FIG. 10
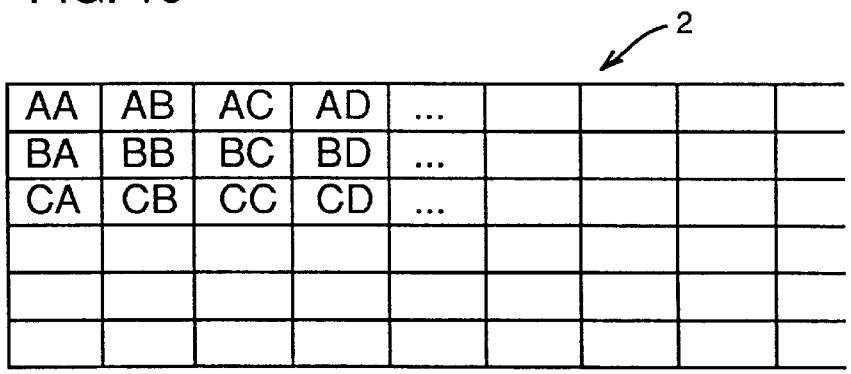
FIG. 11
| MEMORY ACCESS ADDRESS VALUE : 0 | DATA VALUE : 5 | /50 |
| MEMORY ACCESS ADDRESS VALUE : 2 | DATA VALUE : 2 | /52 |
| MEMORY ACCESS ADDRESS VALUE : 4 | DATA VALUE : 9 | /54 |
| MEMORY ACCESS ADDRESS VALUE : 6 | DATA VALUE : 4 | /56 |
| MEMORY ACCESS ADDRESS VALUE : 8 | DATA VALUE : 1 | /58 |
FIG. 12
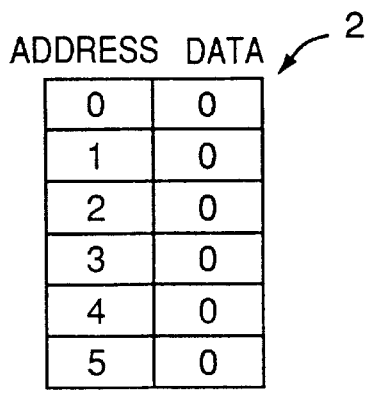
FIG. 13
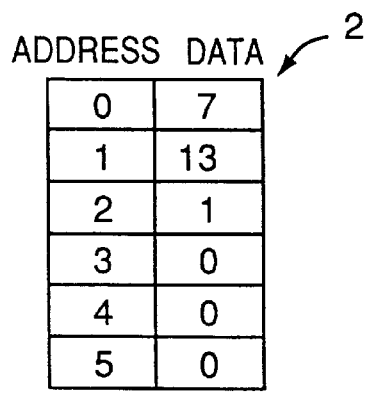
FIG. 14
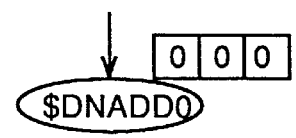

IMAGE OPERATION PROCESSING APPARATUS STORING DISCRETE DATA EFFICIENTLY IN A MEMORY AND OPERATING METHOD THEREOF

BACKGROUND OF THE INVENTION

1. Field of the Invention

The present invention relates to a field of information processing adapted to processing image signals. More particularly, the present invention relates to an image operating processing apparatus having a function of using an image memory efficiently, and capable of executing a specific operation processing with high efficiency.

2. Description of the Background Art

Referring to FIG. 1, a data driven image operation processor 21 which is an example of a conventional image operation processing apparatus includes input ports IA and IB connected to data transmission paths 27 and 28, respectively, and output ports OA and OB connected to data transmission paths 29 and 30, respectively. The data driven image operation processor 21 further includes an output port OV and an input port IV connected to an image memory section 31 through data transmission paths 24 and 25, respectively.

Image memory unit 31 includes a memory interface 22 connected to data transmission paths 24 and 25, and an image memory 23 connected to memory interface 22 through a memory access control line 26.

Data driven image operation processor 21 time sequentially receives a signal input packet from data transmission path 27 or 28 through input port IA or IB. The signal input packet has a generation number allotted in accordance with time order of input. Packet format will be described later.

Data driven image operation processor 21 stores a pre-set content of processing or operation (data driven program), and processing proceeds in accordance with the set content. Data driven image operation processor 21 outputs an access request to image memory 23 from output port OV. Access request includes reference, update or the like of the content in image memory 23. Upon reception of the access request from data transmission path 24, memory interface 22 accesses image memory 23 through memory access control line 26. After accessing, memory interface 22 returns a result through data transmission path 25 and input port IV to data driven image operation processor 21.

After completion of the processing of the signal input packet, data driven image operation processor 21 outputs a signal output packet from output port OA or OB to data transmission path 29 or 30.

Referring to FIG. 2, a data packet 36 input to memory interface 22 through data transmission path 24 includes an instruction code 70, a generation number 72, first data 74, second data 76, a processor number 78 and an entry number 80.

Instruction code 70 indicates content of processing on image memory 23. For example, it indicates reference or updating of the content of image memory 23.

Generation number 72 is an identifier allotted in accordance with the order of input time sequence, at the time of input from data transmission path 27 or 28 to data driven image operation processor 21. Generation number 72 is utilized for matching of data at data driven image operation processor 21. Meanwhile, generation number 72 also has a meaning of an address for memory interface 22, when accessing image memory 23. A technique on which the present invention is based is disclosed in Japanese Patent Laying-Open No. 5-274213. In the technique disclosed in this laid-open application, the generation number is subjected to address modification (offset modification) using the first data 74 or the second data 76, and an address for accessing the image memory 23 is determined based on the address modified generation number. In the disclosure of this application, generation number 72 (24 bits) is divided into two, 12 bits by 12 bits, in accordance with initialization of data driven image operation processor 21. Operation proceeds assuming that the upper 12 bits represent position of a line on an image plane (that is, position in Y direction) and the lower 12 bits represent pixel information of the image plane (that is, position in X direction).

First and second data 74 and 76 are both data having meaning thereof changed in accordance with the content of instruction code 70. When instruction code 70 represents updating of image memory, for example, first data 74 represents data to be written to image memory 23. At this time, the second data 76 is meaningless. When instruction code 70 represents reference to image memory 23, both first and second data 74 and 76 are meaningless.

The processor number is a number unique to the processor to which the data packet is to be applied. When a data packet is received, the image operation processor determines whether the processor number 78 matches the processor number of itself, and if the number matches, the processor processes the data packet. If not, the processor outputs the data packet from either one of the output ports, to that processor which has the corresponding processor number.

Entry number 80 is information associated with the input packet.

In this example, data packets on data transmission paths 25, 27, 28, 29 and 30 each have the same structure as that shown in FIG. 2. However, data in each field may differ slightly. For example, in the data packet on data transmission path 25, instruction code 70 and generation number 72 are the same as the instruction code and the generation number of the input data packet applied to memory interface 22. A result of accessing to image memory 23 in accordance with instruction code 70 is stored in the first data 74. Entry number 80 is used for fetching an instruction or the like to be executed next, after an execution of the instruction. Entry number 80 corresponds to a program counter in a Von Neumann type processor. The second data 76 is, at present, meaningless.

The signal input packets are input time sequentially through input port IA or IB to data driven image operation processor 21. Data driven image operation processor 21 performs digital filtering or the like on the signal input packets. Results of processing by data driven image operation processor 21 may be written to image memory 23.

When the result of processing by data driven image operation processor 21 is written to image memory 23 as mentioned above, sometimes that the address modified generation number of the packet is thinned out by an execution program. As a result, sometimes data are stored sparsely in image memory 23, as shown in FIG. 3. The example shown in FIG. 3 corresponds to thinning out of data for displaying image data having 800×1024 pixels on a monitor having display resolution of 400×512 pixels after image processing, as shown in FIG. 4, for example. In the example shown in FIG. 4, it is necessary to maintain data of high resolution for data processing itself and satisfactory image processing is impossible if the resolution is lowered from the start. Here, data processing is performed with high resolution, and only the display of the image is given with low resolution. The data necessary for display are those of even-numbered addresses both in X and Y directions, that is, every other pixel. At this time, the state of data storage in image memory 23 is as shown in FIG. 3.

However, in this case, as can be readily seen from FIG. 3, the efficiency of use of image memory 23 is low. Memory address areas corresponding to the odd-numbered addresses are not used. In the example shown in FIG. 3, efficiency of use is ¼, that is, ¾ of the entire areas are not used. When a large amount of data is to be processed, such inefficient use of the memory should be avoided. Therefore, when it is known in advance that the data would be stored sparsely as shown in FIG. 3, it is preferred to use an image operation processor which has a function of improving efficiency of use of the memory in some way.

Further, the conventional data driven image operation processor has a problem that certain types of operations cannot be executed efficiently. It is especially problematic when an operation, typically an accumulation (summation) is performed on mutually adjacent plurality of data before writing the data to image memory 23 and the result of the operation is to be written to a prescribed address. In that case, the conventional data driven image operation processor processes in accordance with a flow graph of FIG. 5. In the example shown in FIG. 5, the generation number is divided into three. These divided pieces correspond to a field number, a line number and a pixel number of the image, for example. In FIG. 5, the generation number is depicted divided into three, at an upper left side of each node.

FIG. 5 is a flow graph of a process in which data corresponding to continuous 8 addresses are accumulated. The operation $ DR represents writing of data of the packet to an address which is designated by a modification value of the instruction and the generation number of the packet. The operation $ DNADD 0 represents an operation in which data is read from an address designated by the modification value of the instruction and the generation number of the packet, the read data is added to data in the data packet, and the result is taken as the data in the packet. Conventionally, it has been necessary to read data of respective addresses one by one and add the read data in order, as shown in FIG. 5, and finally to write the data at a desired address (not shown in FIG. 5). The longer the flow graph, the larger the amount of operation and the slower the speed of processing. It is desired that the flow graph of FIG. 5 is made shorter.

SUMMARY OF THE INVENTION

Therefore, an object of the present invention is to provide an image operation processing apparatus which allows efficient use of memory areas.

Another object of the present invention is to provide an image operation processing apparatus which has a simple structure and, even when manner of use of memory addresses differ, allows efficient use of memory areas for each manner.

A still further object of the present invention is to provide an image operation processing apparatus having a simple structure which allows external setting such that even when manner of use of memory addresses differ, the memory areas can be used efficiently for each manner.

An additional object of the present invention is to provide an image operation processing apparatus having a simple structure and allowing efficient use of memory areas, and capable of efficiently executing a specific operation such as accumulation.

A still further object of the present invention is to provide an image operation processing apparatus, having a simple structure and allowing efficient use of memory areas having multi-dimensional address space.

A still further object of the present invention is to provide a method of operating an image operation processing apparatus which allows efficient use of memory areas.

A still further object of the present invention is to provide a method of operating an image operation processing apparatus in which addresses generated discretely in a prescribed process are translated to correspond to continuous addresses in the memory, so as to enable storage of the result of the prescribed process efficiently utilizing the memory areas.

An additional object of the present invention is to provide a method of operating an image operation processing apparatus allowing efficient use of memory areas and allowing efficient execution of a specific operation such as accumulation.

The image operation processing apparatus in accordance with the present invention is connected to a memory, for accessing and processing data packets each including instruction information and an address of a prescribed address space, and it includes an address translation unit for translating an address included in an incoming data packet to an address of a partial address space which is smaller than the prescribed address space, and a memory access unit for accessing the memory in accordance with the address translated by the address translation unit for performing a process in accordance with the instruction information included in the packet.

The address included in the incoming data packet is translated to an address of a partial address space which is smaller than the prescribed address space formed by the addresses of the data packets. As the memory is accessed in accordance with the translated address, the memory area used is reduced, and the memory area can effectively be utilized.

Preferably, the address translation unit includes a bit shift unit for shifting to the right by a prescribed number of bits, the address included in the incoming data packet.

The address included in the data packet is shifted to the right by a prescribed number of bits, and the memory is accessed in accordance with the shifted address. Since the address of the data packet is divided by $2^n$ (n represents the prescribed number of bits), the address space used is reduced by that amount. Here, the memory area which has been used sparsely is packed up, and hence the memory area is used efficiently.

More preferably, it is possible to set the number of bits for the shifting to the right by the bit shift unit. The bit shift unit shifts to the right the address included in the incoming data packet by the number of bits set by the bit number setting unit.

In shifting the address of the data packet to the right, the number of bits to be shifted can be set. Since the number of right shift can be changed in accordance with dispersion of addresses in the data packets, it is possible to cope with various manners of dispersion of the addresses. Preferably, the number of bits to be shifted can be set externally.

More preferably, the prescribed address space is a multi-dimensional address space, and the address translation unit shifts to the right by a prescribed number of bits, an element of each dimension of the address included in the incoming data packet independently from each other.

With the address space of the data packet being multi-dimensional, an element of each dimension is shifted to the right by the prescribed number of bits, independent from each other. Therefore, even when dispersion of data in the address space differ dimension by dimension, it is possible to pack up the data in each dimension, whereby the memory area can efficiently be used.

The method of operating an image operation processing apparatus in accordance with another aspect of the present invention is a method of operating an image operation processing apparatus connected to a memory for processing, by accessing to a memory, data packets each including instruction information and an address in a prescribed address space. The image operation processing apparatus includes an address translation unit for translating the address included in an incoming data packet to an address in a partial address space which is smaller than the prescribed address space of the memory, and a memory access unit for accessing the memory in accordance with the address translated by the address translation unit for performing a process in accordance with the instruction information included in the packet. The operating method includes the steps of determining address translation by the address translation unit such that addresses generated discretely in a prescribed process occupy continuous addresses in the memory after translation by the address translation unit, applying a plurality of data packets respectively holding discrete addresses generated in the prescribed process to the image operation processing apparatus, and storing data in the memory at addresses after translation by the address translation unit.

Discrete addresses included in the incoming data packets are translated to addresses in the partial address space which is continuous and smaller than the prescribed address space formed by the addresses of the data packets. As the data is stored in the memory in accordance with the translated address, the memory area used is reduced, and the memory area can efficiently be utilized.

Preferably, the address translation unit includes a bit shift unit for shifting to the right the addresses included in the incoming data packets by a prescribed number of bits, addresses generated in the prescribed process are generated with an interval of $2^n-1$ (n is an integer not smaller than 1), and the step of determining address translation includes the step of determining the number of bits for the right shift at the bit shift unit to be n.

The addresses generated with the interval of $2^n-1$ are shifted to the right by n bits by the address translation unit. As a result of the right shift, the addresses generated at the interval of $2^n-1$ are turned to be continuous addresses. Accordingly, the data of the original discrete addresses come to be stored in continuous addresses of the memory, and hence memory area can efficiently be utilized.

The method of image operation processing in accordance with a still another aspect of the present invention is for processing, by accessing a memory, data packets each including instruction information and an address of a prescribed address space. The method of image operation processing includes the steps of determining address translation such that addresses discretely generated in a prescribed process occupy continuous addresses in the memory after address translation, and storing a plurality of data packets each having the discrete address generated in the prescribed process at translated addresses of the memory.

A computer readable recording medium in accordance with a still another aspect of the present invention stores the program for implementing the above described method of image operation processing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows a state of data storage in a memory in the data driven image operation processor in accordance with the embodiment.

FIG. 11 shows packets subjected to accumulation by the data driven image operation processor in accordance with the embodiment.

FIG. 12 shows an example of a state of an external image memory 2 before accumulation by the data driven image operation processor in accordance with the embodiment.

FIG. 13 shows an example of a state of the external image memory 2 after accumulation by the data driven image operation processor in accordance with the embodiment.

FIG. 14 is a flow graph of accumulation operation performed by the data driven image operation processor in accordance with the embodiment.

DESCRIPTION OF THE PREFERRED EMBODIMENTS

In the embodiment below, a data driven image operation processor is descried as an example of the present invention. The present invention, however, is applicable not only to the data driven processors but also is applicable to general processors, provided that a memory is used therein.

Figure 6:
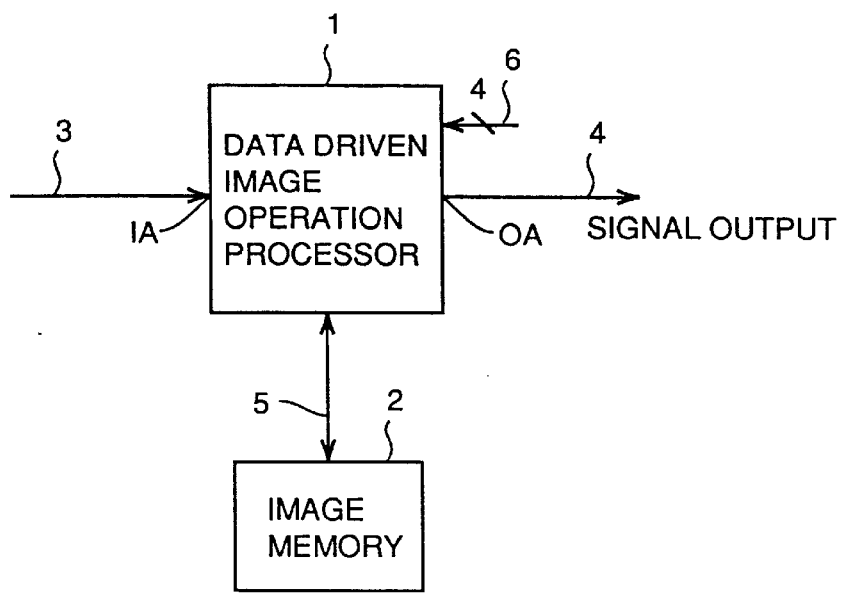
FIG. 6 is an illustration showing an overall function of a data driven image operation processor in accordance with an embodiment of the present invention.

Referring to FIG. 6, a data driven image operation processor 1 in accordance with an embodiment of the present invention includes an input port IA connected to a data transmission path 3 and an output port OA connected to a data transmission path 4. Data driven image operation processor 1 is further connected to an external image memory 2 through a data transmission path 5. Data driven image operation processor 1 has a function of efficiently utilizing areas of external image memory 2. As will be described later, data driven image operation processor 1 has a function of shifting to the right generation numbers of incoming data packets (which correspond to addresses for accessing external image memory 2) and accessing external image memory 2 in accordance with the shifted generation numbers. Number of bits to be shifted is set by a signal consisting of 4 bits applied externally through an external terminal 6. In the following embodiment, the generation number is divided into three portions corresponding to a field number FD#, a line number LN# and a pixel number PX#. That the generation number is divided into a plurality of fields and is referred to as the generation number being multi-dimensional (multiple-dimension). In the present embodiment, the generation number is three-dimensional, of which only the line number and pixel number are shifted.

Figure 7:
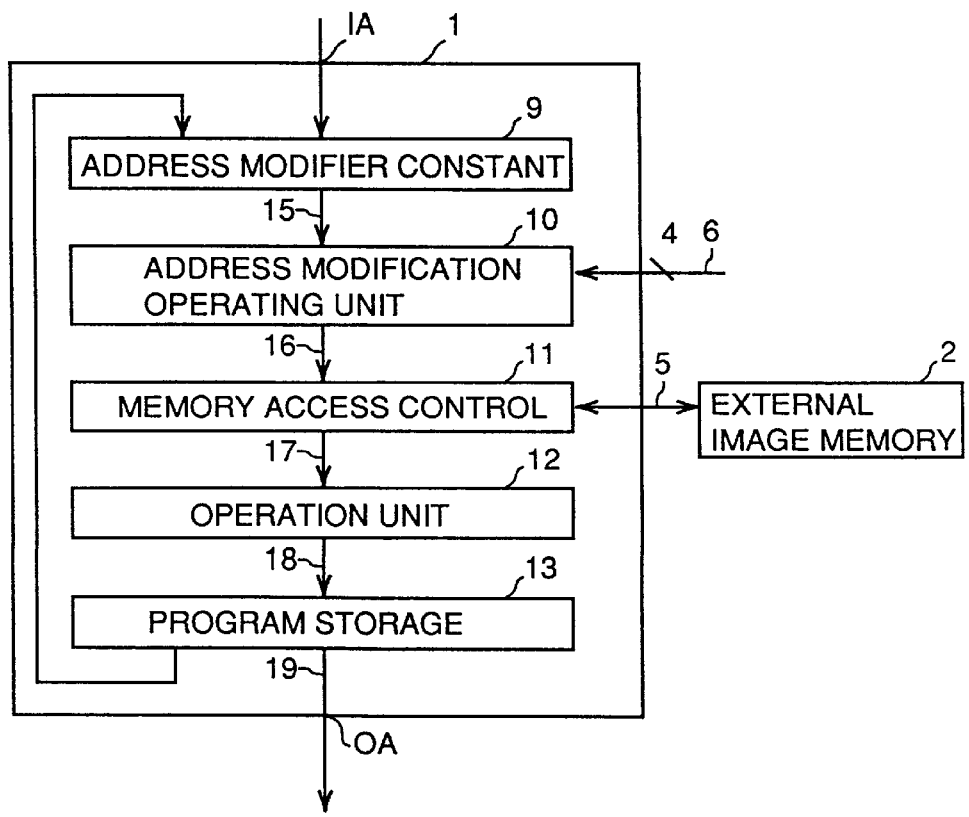
FIG. 7 is a block diagram showing a schematic structure of the data driven image operation processor in accordance with the embodiment.

Referring to FIG. 7, data driven image operation processor 1 includes an address modifier constant 9 storing in advance an address modifier constant, receiving a data packet from input port IA, storing an address modifier constant corresponding to an entry number in the data packet in a prescribed field of the data packet and outputting the data packet to data transmission path 15; an address modification operating unit 10 receiving the data packet on data transmission path 15 and a signal of 4 bits from external terminal 6 for performing address modification processing on each dimension of the generation number independently, performing right bit shifting by a number of bits with the number designated by external terminal 6, and for outputting the translated address to data transmission path 16; a memory access control 11 as a memory access unit, for accessing, when an instruction code of the data packet received from data transmission path 16 is an instruction for a memory access, an external image memory 2 through data transmission path 5 and for outputting resulting data packet to data transmission path 17; an operation unit 12 for performing a process designated by the instruction code of the data packet from data transmission path 17 and outputting the result to data transmission path 18; and a program storage 13 storing program instructions and the like in advance, for outputting a data packet storing a read instruction or the like to a data transmission path 19 or to address modifier constant 9 in accordance with an entry number of the data packet from data transmission path 18. Data transmission path 19 is connected to output port OA.

Address modifier constant 9 stores an address modifier constant referred to before the memory access in correspondence with the entry number of the data packet. In accordance with the data packet input from input port IA or program storage 13, an address modifier constant corresponding to the entry number is read and stored in the data packet. The address modifier constant represents an offset amount with respect to the generation number, that is, an address offset amount at the time of memory access.

Figures 8, 9:
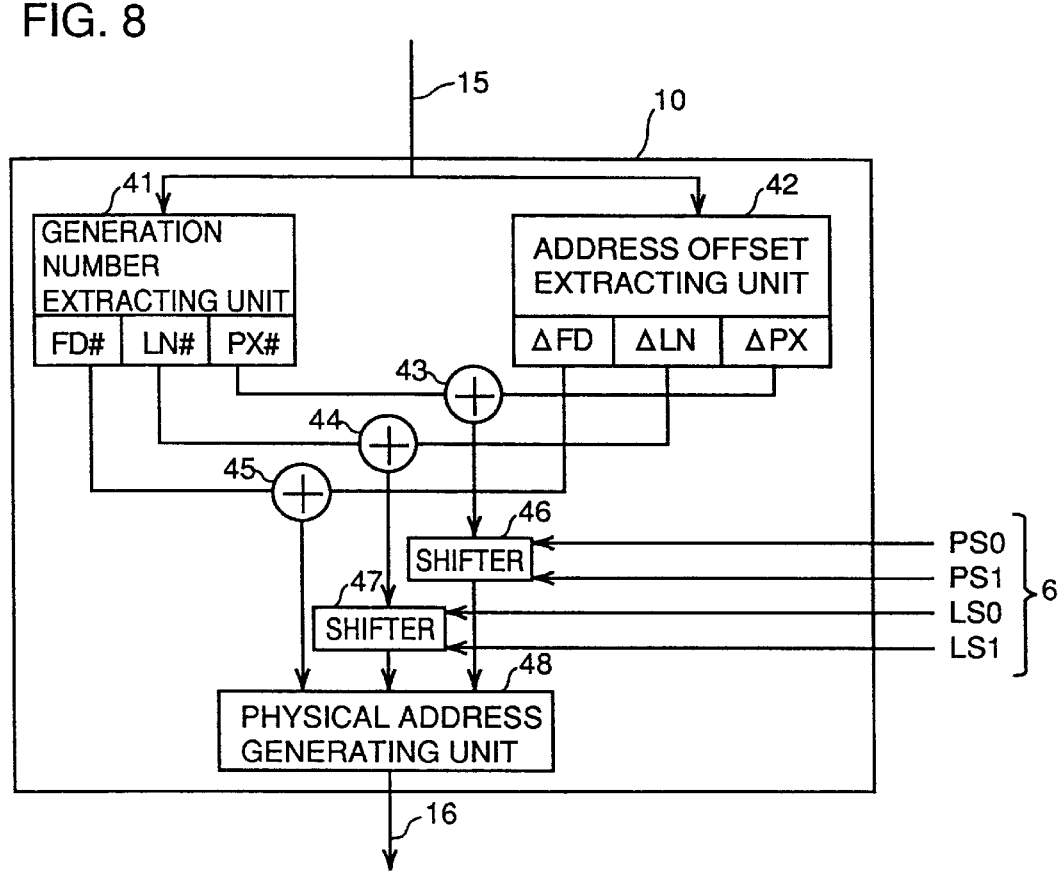
FIG. 8 is a block diagram of an address modification operating unit.
FIG. 9 shows an example of a program executed by the data driven image operation processor.

Referring to FIG. 8, signals applied to address modification operating unit 10 from external terminal 6 includes 4 bit signals PS0, PS1, LS0 and LS1. Signals PS0, PS1, LS0 and LS1 each assume the value of 0 or 1. Accordingly, four different values from 0 to 3 can be designated by PS0 and PS1, and four different values can be designated by LS0 and LS1.

Address modification operating unit 10 includes a generation number extracting unit 41 for extracting the generation number of the input data packet; an address offset extracting unit 42 for extracting an address offset of the input data packet; adders 45, 44 and 43 for adding field number FD#, line number LN# and pixel number PX# output from generation number extracting unit 41 to offset values ΔFD, ΔLN and ΔPX of the field number, the line number and a pixel number output from address offset extracting unit 42, respectively; shifters 46 and 47 for performing arithmetic shift right of outputs from adders 43 and 44 by the number of bits designated by the signals PS0 and PS1 as well as signals SL0 and LS1, respectively; and a physical address generating unit 48 for calculating and outputting an address for accessing external image memory 2 from outputs of adder 45, and shifters 47 and 46.

FIG. 9 shows an example of a program loaded in data driven image operation processor 1. Referring to FIG. 9, each row of program 14 includes an address (ADDRESS), an operation code (OPECODE), a node (NODE) and a constant (CONSTANT). Of these values, values of the columns ADDRESS, OPECODE and NODE are loaded to program storage 13, and the values in the column CONSTANT are loaded, together with the values in the column ADDRESS, to address modifier constant 9. The values in the column ADDRESS are functionally identical to "entry numbers" of the data packets.

The data driven image operation processor 1 operates in the following manner. Prior to input of data to be processed to data driven image operation processor 1, it is necessary to program the processor. An assembled program is loaded to data driven image operation processor 1. The program has such a structure as shown in FIG. 9. Instructions and the like of the program are stored in program storage 13, as described above. Address modifier constants and so on referred to before memory access are stored in address modifier constant 9, as described above.

An input packet is taken inside data driven image operation processor 1 through input port IA. Address modifier constant 9 stores address information (entry numbers) and corresponding constants (address modifier constants), and therefore the input packet reads the corresponding address modifier constant based on the entry number 80 (see FIG. 11) of the packet, stores the read constant in itself, and proceeds to address modification operating unit 10 through data transmission path 15.

When the instruction of the input packet is a memory access instruction, address modification operating unit 10 operates in the following manner. Referring to FIG. 8, the packet input through data transmission path 15 is copied, and one is applied to generation number extracting unit 41 and the other is applied to address offset extracting unit 42. Generation number extracting unit 41 extracts field number FD#, line number LN# and pixel number PX# of the generation numbers of the input packet, and transmits the extracted numbers to adders 45, 44 and 43, respectively. Meanwhile, address offset extracting unit 42 extracts offset values ΔFD, ΔLN and ΔPX of the field number, line number and pixel number of the generation number taken into the packet at address modification operating unit 10 and transmits the extracted values to adders 45, 44 and 43, respectively.

Adders 45, 44 and 43 each add the two input values, and apply the results to physical address generating unit 48 and shifters 47 and 46, respectively. Shifters 47 and 46 perform right shift of the sum of line number LN# and line number offset ΔLN and the sum of pixel number PX# and pixel number offset ΔPX, respectively, and applies the results to physical address generating unit 48.

Here, the amount of shifting of the right shift by the shifters 46 and 47 is determined by the signals PS0 and PS1, and LS0 and LS1, respectively. Signals PS0 and PS1 are both for determining the amount of right shift in the pixel direction (X direction) of the access address. The signals LS0 and LS1 are both for determining the amount of right shift in the line direction (Y direction) of the access address. For example, when the signals are (PS1, PS0)=(0, 0), right shift in the X direction of the access address is not performed. When the signals are (PS1, PS0)=(0, 1), the access address value in the X direction is shifted by 1 bit to the right. The least significant bit of the address in the X direction which has been shifted out is discarded. Similarly, when the signals are (PS1, PS0)=(1, 0), the access address value in the X direction is shifted by 2 bits to the right. When the signals are (PS1, PS0)=(1, 1), the address value in the X direction is shifted by 3 bits to the right. By the right shift, shifters 46 and 47 substantially divide the address by a power of two, determined by the values of signals PS0, PS1 and LS0 and LS1, respectively.

Physical address generating unit 48 generates and outputs a physical address for accessing external image memory 2, based on the outputs from shifters 47 and 46.

The physical address is stored as an image memory access address value, and the packet is applied to memory access control 11 through data transmission path 16 shown in FIG. 7. Memory access control 11 refers to instruction code 70 (see FIG. 11) of the packet, and if it is an instruction related to memory access, it accesses external image memory 2 through data transmission path 5 based on the instruction and the memory access address value operated in address modification operating unit 10.

Thereafter, the resulting packet is applied to operating unit 12, and operating unit 12 performs a process based on the instruction and data, and applies the resulting packet to program storage 13. Program storage 13 reads an instruction to be executed next, next "entry number" and so on from pre-stored program, based on address information (entry number) of the applied packet, stores the read information in a packet and outputs. At this time, if the processor number of the packet matches the processor number of data driven image operation processor 1, the packet is applied to address modifier constant 9. Otherwise, it is output to the outside of data driven image operation processor 1 through data transmission path 19 and output port OA.

The data driven image operation processor 1 in accordance with this embodiment provides the following effects. As described above, when the instruction code of the input data packet is a memory access instruction, address modification operating unit 10 performs arithmetic shift right of address modified line number LN# and pixel number PX# of the generation number of the packet by an amount of shifting determined by the values of signals PS0, PS1 and LS0 and LS1.

Figure 1:
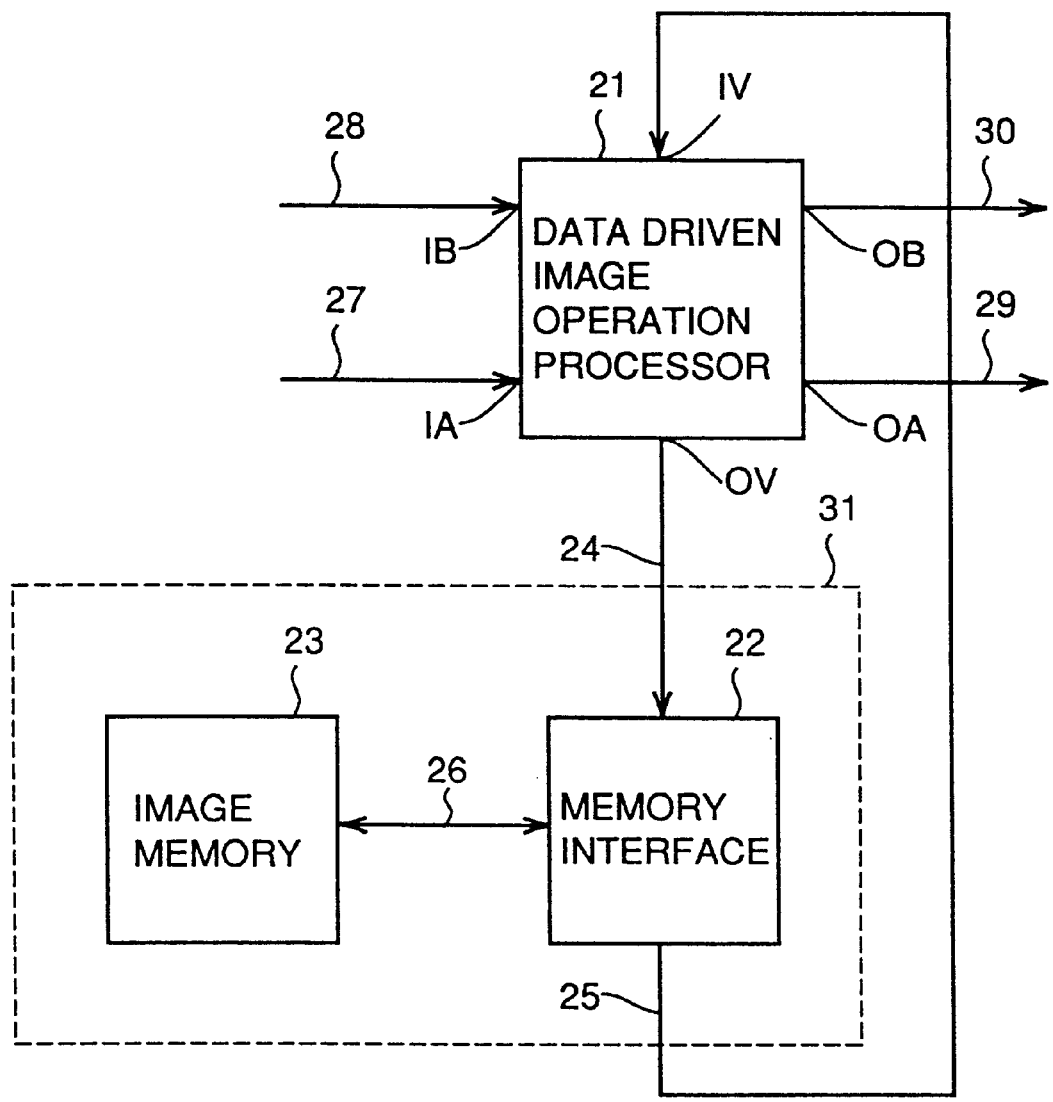
FIG. 1 is an illustration showing an overall function of a conventional data driven image operation processor.
Figure 2:
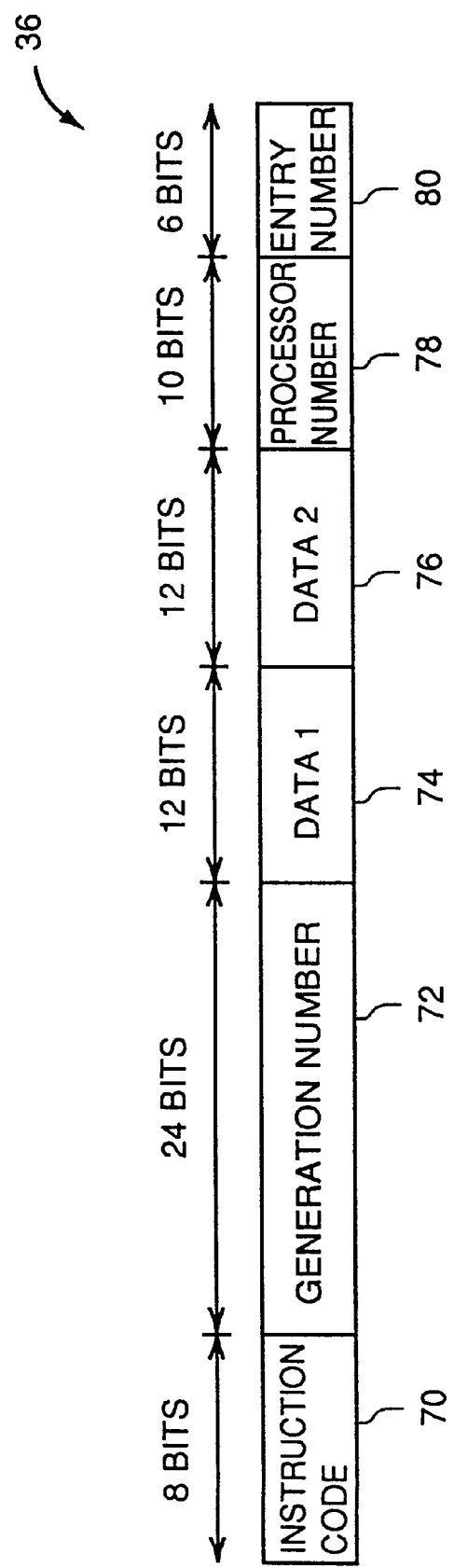
FIG. 2 schematically shows a packet format.
Figure 3:
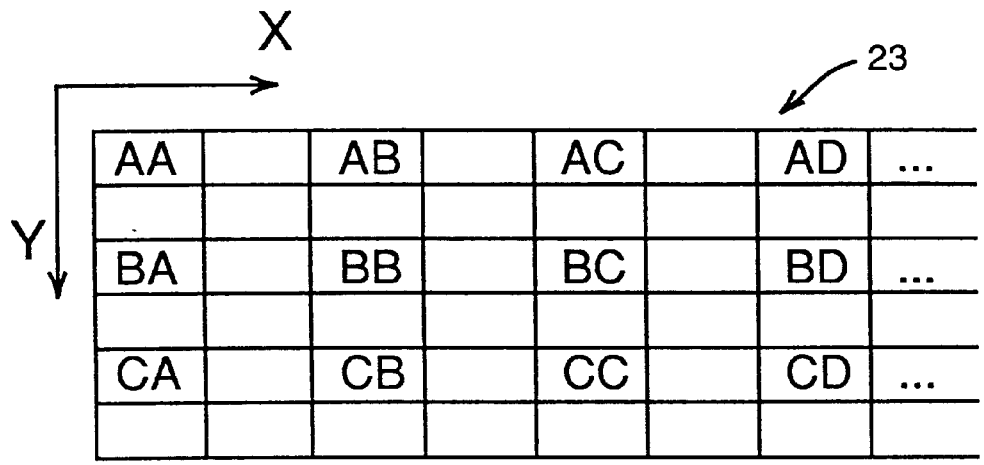
FIG. 3 shows an example of a memory in a state storing data in discrete manner.
Figure 4:
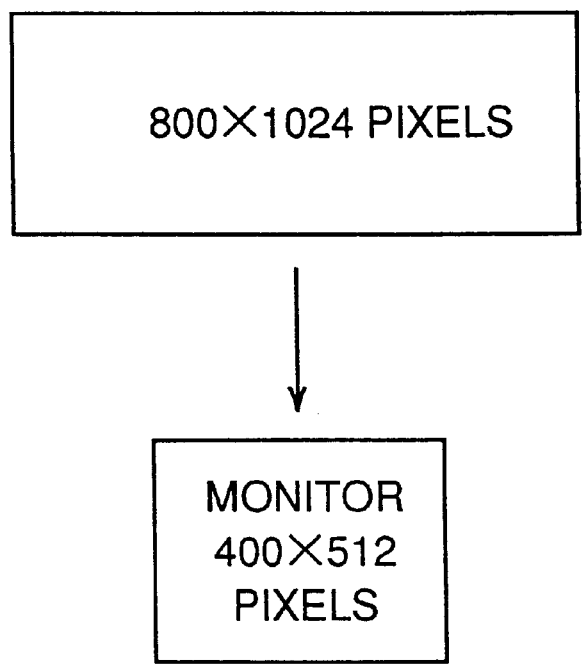
FIG. 4 is a schematic diagram showing a process of storing data at discrete addresses.
Figure 5:
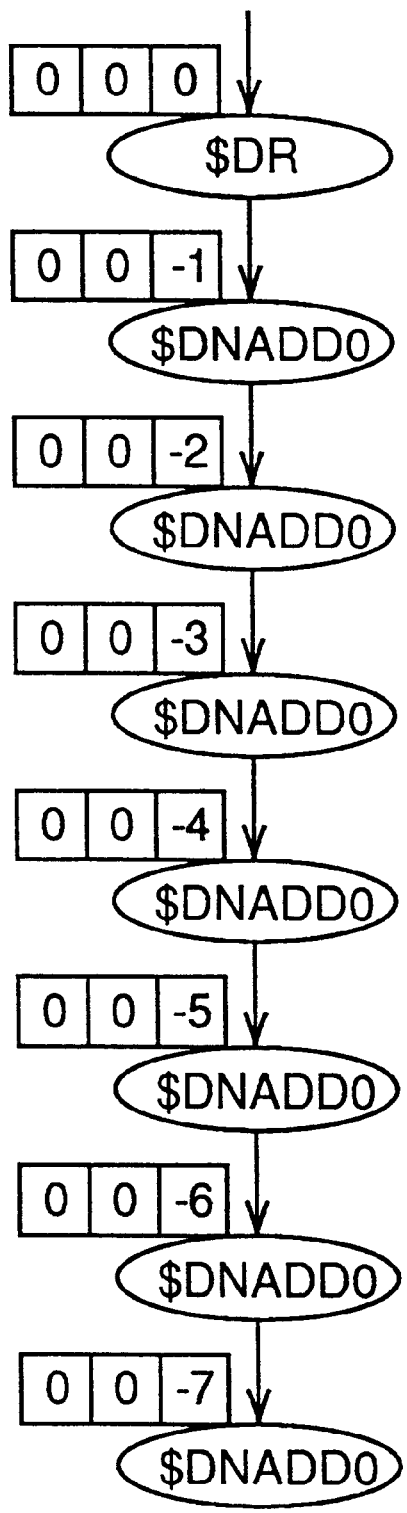
FIG. 5 is a flow graph of accumulation operation by the conventional data driven image operation processor.

When portions corresponding to the line number and pixel number of the memory access addresses of continuous input packets are even-numbered ones only (that is, when the interval therebetween is $2^1-1=1$), the data applied by these data packets stored in the corresponding addresses would be as shown in FIG. 3. When the signals are set to PS0=1, PS1=0, LS0=1 and LS1=0 in the data driven image operation processor in accordance with the present invention, least significant bits are discarded and only upper bits are maintained of portions corresponding to the line number and pixel number of the address. More specifically, the portions corresponding to the line number and pixel number are divided by 2. Therefore, when the data are written in the memory using resulting addresses, the state of storage would be as shown in FIG. 10.

Referring to FIG. 10, under the above-described condition, the data are stored densely in order at continuous addresses, and the data are not stored discretely. When the interval of addresses in the line direction generated discretely in the original process is $2^{n-1}$, it is effective if the line number is shifted by n bits, as the shifted addresses are completely continuous. Further, when the space of addresses in the pixel direction is $2^{m-1}$, it is effective if the pixel number is also shifted by m bits, as the shifted addresses would be perfectly continuous. More specifically, each of the addresses generated discretely in the original address space are mapped densely in a smaller address space, and remaining areas of the memory can be used for other purposes. Thus, the memory can be utilized efficiently.

However, the present invention is not limited thereto. When the address space is $2^{n-1}$ and addresses are shifted to the right by an amount of shifting larger than 1 and smaller than n, the memory space can be saved to some extent, though there remains some empty areas. This is because the address space formed by the shifted addresses is smaller than the original address space. The address interval in the line direction may not necessarily be the same as the address interval in the pixel direction, and amounts of shifting in these directions need not be the same.

In this manner, by shifting addresses of memory access to the right, it becomes possible to prevent discrete storage of data in the memory area, when it is known in advance that the data addresses will be thinned out later. This realizes efficient use of the memory area. In calculating addresses of memory access, when the generation number is made multi-dimensional and the value of each dimension is shifted to the right, it becomes possible to efficiently utilize the memory area even when the memory has multi-dimensional address space.

Method of using the processor in accordance with the embodiment is extendable for a certain type of instructions. Assume that the amount of right shift at the address modification operating unit of a memory access address value is larger than the interval of the memory access value of the packet. For example, assume that the address in the X direction for memory storage of the packet resulting from a prescribed process is an even-number and that the address shift amount of the pixel number is 2 bits. At this time, values of the portion corresponding to the pixel number of memory access addresses are 0, 2, 4, 6, 8, 10. . . , while values of the portion corresponding to the pixel number after right shift of 2 bits would be 0, 0, 1, 1, 2, 2. . . Namely, two packets come to have the same address after the right shift. This is apparent when each address is given in binary representation. The data driven image operation processor in accordance with the present invention attains higher speed in a certain type of operation, referred to as accumulation, utilizing such a feature.

Accumulation is one of the operations performed by the data driven image operation processor. In accumulation, content of a memory access address determined by the generation number of a packet is read, the read data is added to the data in the packet, and the result of addition is written to an address indicated by a memory access address. conventionally, a plurality of instructions have been used as shown in the flow graph of FIG. 14 for accumulation.

In the processor in accordance with the present invention, accumulation is realized by one instruction. Implementation of accumulation by the processor will be described with reference to FIGS. 11 to 13. Assume that packets 50, 52, 54, 56 and 58 such as shown in FIG. 11 are applied to the data driven image operation processor in accordance with the present embodiment. It is assumed that instructions (not shown) of the packets shown in FIG. 11 are all accumulation. Further, it is assumed in advance that the content of external image memory is as shown in FIG. 12. In this example, the content of the external image memory 2 is one-dimensional. In the following process, it is assumed that the signals applied from external terminal 6 shown in FIG. 8 are (PS1, PS0)=(1, 0). Since the access address is one-dimensional, signals LS0 and LS1 both have the value of 0.

At this time, the memory access address value in the X direction is shifted to the right by 2 bits. Therefore, shifted memory access addresses would be 0 for packets 50 and 52, 1 for packets 54 and 56, and 2 for packet 58. Each packet accesses the memory in accordance with the shifted memory access address, adds the data in the packet to the data at the corresponding address, and writes the result at the address. For example, packet 50 accesses address "0", reads data "0", adds the read data to data value "5" in the packet, and writes the resulting value "5" to address "0". Packet 52 accesses address "0" and reads data "5", adds the read data to data value "2" in the packet, and writes the resulting value "7" to address "0". The operation is similar for other packets. Thus, the data driven image operation processor of the present embodiment realizes by only one instruction, shifting of memory access addresses (saving of memory area by address compression) and data accumulation.

The content of external image memory 2 resulting from such a process is as shown in FIG. 13. Referring to FIG. 13, after all packets are processed, a value "7" resulting from addition of data values (5 and 2) of packets 50 and 52 is stored at address "0". A value "13" resulting from addition of data values (9 and 4) of packets 54 and 56 is stored at address "1". A value "1" which is a result of accumulation of data value "1" of packet 58 is stored in address "2". In this manner, it becomes possible by using one type of instruction to add data values of five data packets shown in FIG. 11 at addresses determined corresponding to respective memory access addresses. A flow graph corresponding to the process on one packet is shown in FIG. 14. Referring to FIG. 14, by the processor of the present embodiment, an instruction only for reading data at a prescribed address and an instruction for writing the result only, are unnecessary. Accordingly, speed of processing can be improved.

Though one-dimensional memory has been discussed with reference to FIGS. 11 to 13, it is possible to implement two-dimensional accumulation by one type of instruction by setting either LS0 or LS1 shown in FIG. 8 to a value other than 0.

In the foregoing description, it is assumed that data are generated with the interval of $2^{n-1}$ for accumulation and shifting is performed with the number of bits to be shifted being larger than n. However, the present invention is not limited thereto. It is possible to set signals PS0, PS1, LS0 and LS1 such that shifting of n bits is performed. In that case, only one address generated by a prescribed process corresponds to a certain shifted address. Here, it is possible to perform an operation on the data at the addresses generated with the interval of $2^{n-1}$ with data at shifted addresses in one to one correspondence with the generated addresses, and to store the results at the shifted addresses. Therefore, it is possible to store data of the results of operation in continuous address areas of the memory, enabling efficient use of the memory areas. Further, since such a process can be realized by only one instruction, programming is facilitated.

In accordance with the present invention, accumulation can be realized by such a simple flow graph as shown in FIG. 14. Therefore, the amount of operation on each packet is reduced and the processing speed is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of operating an image operation processing apparatus connected to a memory for processing, by accessing to said memory, a data packet including instruction information and an address of a prescribed address space, said image operation processing apparatus including
address translating means for translating the address included in an incoming data packet to an address of a partial address space smaller than said prescribed address space, and
memory access means for accessing said memory in accordance with the address translated by said address translating means for performing a process in accordance with the instruction information included in the packet,
said method comprising the steps of:
determining address translation by said address translating means such that addresses generated discretely by a prescribed process occupy continuous addresses in said memory after translation by said address translating means;
applying a plurality of data packets holding discrete addresses generated by said prescribed process respectively to said image operation processing apparatus, and storing the data packets at addresses of said memory translated by said address translating means,
wherein said address translating means includes bit shift means for shifting the address included in the incoming data packet to the right by a prescribed number of bits;
the addresses generated by said prescribed process are generated with an interval of $2^n-1$, where n is an integer not smaller than 1; and
said step of determining said address translation includes determining the number of bits of the right shift by said bit shift means to said number n.

2. A method of operating an image operation processing apparatus connected to a memory for processing, by accessing to said memory, a data packet including instruction information and an address of a prescribed address space, said image operation processing apparatus including
address translating means for translating the address included in an incoming data packet to an address of a partial address space smaller than said prescribed address space, and
memory access means for accessing said memory in accordance with the address translated by said address translating means for performing a process in accordance with the instruction information included in the packet,
said method comprising the steps of:
determining address translation by said address translating means such that addresses generated discretely by a prescribed process occupy continuous addresses in said memory after translation by said address translating means;
applying a plurality of data packets holding discrete addresses generated by said prescribed process respectively to said image operation processing apparatus, and storing the data packets at addresses of said memory translated by said address translating means,
wherein an instruction set, to which the instruction information included in the data packet belongs, includes a specific instruction for performing a prescribed operation between data at a shifted address of said memory determined by shifting the address included in the data packet to the right by a first number of bits and the data included in the data packet, and for writing a result to said shifted address, said address translating means includes bit shift means for shifting the address included in the incoming data packet to the right by a prescribed number of bits, addresses generated in said prescribed process are generated at an interval of $2^n-1$, where n corresponds to said first bit number, and said step of determining said address translation includes the step of determining the number of bits of the right shift by said bit shift means to said number n.

3. A method of operating an image operation processing apparatus connected to a memory for processing, by accessing to said memory, a data packet including instruction information and an address of a prescribed address space, said image operation processing apparatus including address translating means for translating the address included in an incoming data packet to an address of a partial address space smaller than said prescribed address space, and memory access means for accessing said memory in accordance with the address translated by said address translating means for performing a process in accordance with the instruction information included in the packet, said method comprising the steps of:

determining address translation by said address translating means such that addresses generated discretely by a prescribed process occupy continuous addresses in said memory after translation by said address translating means;

applying a plurality of data packets holding discrete addresses generated by said prescribed process respectively to said image operation processing apparatus, and storing the data packets at addresses of said memory translated by said address translating means, wherein an instruction set, to which the instruction information included in the data packet belongs, includes a specific instruction for performing a prescribed operation between data at a shifted address in said memory determined by shifting the address included in the data packet to the right by a first number of bits, and for writing a result to said shifted address, said address translation means includes bit shift means for shifting the address included in the incoming data packet to the right by a prescribed number of bits, addresses generated in said prescribed process are generated at an interval of $2^n-1$, where n is a positive integer smaller than said first number of bits, and said step of determining said address translation includes the step of determining the number of bits of the right shift by said bit shift means to said first number of bits.

4. A method of image operation processing for processing, by accessing a memory, a data packet including instruction information and an address of a prescribed address space, comprising the steps of:

determining address translation such that addresses generated discretely by a prescribed process occupy continuous addresses in said memory after said address translation;

storing a plurality of data packets holding the discrete addresses generated by the prescribed process respectively at addresses of said memory translated by said address translation, wherein the addresses generated by said prescribed process are generated with an interval of $2^n-1$, where n is an integer not smaller than 1, and said address translation includes a process of shifting to the right the addresses by n bits.

5. A method of image operation processing for processing, by accessing a memory, a data packet including instruction information and an address of a prescribed address space, comprising the steps of:

determining address translation such that addresses generated discretely by a prescribed process occupy continuous addresses in said memory after said address translation;

storing a plurality of data packets holding the discrete addresses generated by the prescribed process respectively at addresses of said memory translated by said address translation, wherein an instruction set, to which the instruction information included in the data packet belongs, includes a specific instruction for performing a prescribed operation between data at a shifted address in said memory determined by shifting the address included in the data packet to the right by a first number of bits and the data included in the data packet, and for writing a result to said shifted address, the addresses generated by said prescribed process are generated with an interval of $2^n-1$, where n corresponds to said first number of bits, and said address translation includes a process of shifting the addresses to the right by said n bits.

6. A method of image operation processing for processing, by accessing a memory, a data packet including instruction information and an address of a prescribed address space, comprising the steps of:

determining address translation such that addresses generated discretely by a prescribed process occupy continuous addresses in said memory after said address translation;

storing a plurality of data packets holding the discrete addresses generated by the prescribed process respectively at addresses of said memory translated by said address translation, wherein an instruction set to which instruction information included in the data packet belongs includes a specific instruction for performing a prescribed operation between data at a shifted address in said memory determined by shifting the address included in the data packet to the right by a first number of bits, and the data included in the data packet, and for writing a result to said shifted address, the addresses generated by said prescribed process are generated with an interval of $2^n-1$, where n is a positive integer smaller than said first number of bits, and said address translation includes a process of shifting the addresses to the right by said first number of bits.

* * * * *